Dec. 21, 1937.  J. KANTOR  2,103,158
BOTTLE FILLING MACHINE
Filed Dec. 29, 1932  6 Sheets-Sheet 1

INVENTOR.
James Kantor,
BY Hood & Hahn.
ATTORNEYS

Dec. 21, 1937.   J. KANTOR   2,103,158
BOTTLE FILLING MACHINE
Filed Dec. 29, 1932   6 Sheets-Sheet 2

INVENTOR.
James Kantor,
BY Hood & Hahn
ATTORNEYS

Dec. 21, 1937.    J. KANTOR    2,103,158
BOTTLE FILLING MACHINE
Filed Dec. 29, 1932    6 Sheets-Sheet 3

INVENTOR.
James Kantor,
BY
Hood & Hahn.
ATTORNEYS

Dec. 21, 1937.    J. KANTOR    2,103,158
BOTTLE FILLING MACHINE
Filed Dec. 29, 1932    6 Sheets—Sheet 6

INVENTOR.
James Kantor,
BY Hood & Hahn.
ATTORNEYS

Patented Dec. 21, 1937

2,103,158

UNITED STATES PATENT OFFICE 2,103,158

BOTTLE FILLING MACHINE

James Kantor, Chicago, Ill., assignor to The Liquid Carbonic Corporation, Chicago, Ill., a corporation of Delaware Application December 29, 1932, Serial No. 649,275

17 Claims. (Cl. 226—75)

My invention relates to improvements in automatic bottle filling machines and primarily to that type of bottle filling machine wherein the bottle has initially delivered thereto a predetermined quantity of syrup, after which the bottle is filled preferably by what is known as the counter-pressure system, with carbonated water and is then delivered to the crowning machine which places the crown thereon after which the bottle is ready for delivery.

One of the objects of my invention is to provide a machine which comprises in a self-contained unitary apparatus means for delivering the bottle to the syruper, transferring the bottle from the syruper to the filling apparatus, transferring the bottle from the filling apparatus to the crowner, and then delivering the bottle from the machine. Another object of my invention is to provide a machine having the above characteristics which may be rapidly operated and which will handle a large number of bottles in a comparatively short space of time.

The machine embodying my invention is what may be termed an 18-spout filler, that is, the apparatus for delivering the carbonated water to the bottle is provided with eighteen spouts for the purpose of handling eighteen bottles and delivering carbonated water in the proper manner throughout one rotation of the filler table. In other words, there are eighteen bottles being treated by the filling machine at the same time, although the bottles are delivered to the machine and taken therefrom one at a time. Such an arrangement provides for a rapid filling of the bottles with carbonated water as it will be understood that during the process of filling the bottles with carbonated water the bottle has initially delivered thereto $CO_2$ which develops sufficient counter-pressure in the bottle so that upon the admission of the carbonated water to the bottle it will flow into the bottle slowly, the $CO_2$ escaping gradually as the water flows therein. After the bottle has been filled the remaining gas in the bottle is "snifted" and the bottle is ready for delivery to the crowning machine. The various operations of filling take place in the bottle during the rotation of the bottle on the carrier table and it is obvious that in order to increase the speed it is advisable to have as large a number of bottles as possible going through the different steps of filling.

A further object of my invention is the provision of means whereby the continued flow of the bottles to the filler shall not be interrupted during the syruping operation nor shall the continued flow of bottles from the filler be interrupted during the crowning operation.

Another object of my invention is to provide means whereby a syruper shall deliver the suitable predetermined quantity of syrup to the bottle during its movement to the filler, without stopping this movement and to provide a crowner which shall apply the crown to the bottle during its movement from the filling machine and without stopping and interrupting this movement.

For the purpose of disclosing my invention I have illustrated certain embodiments thereof in the accompanying drawings, in which.

Figure 1:
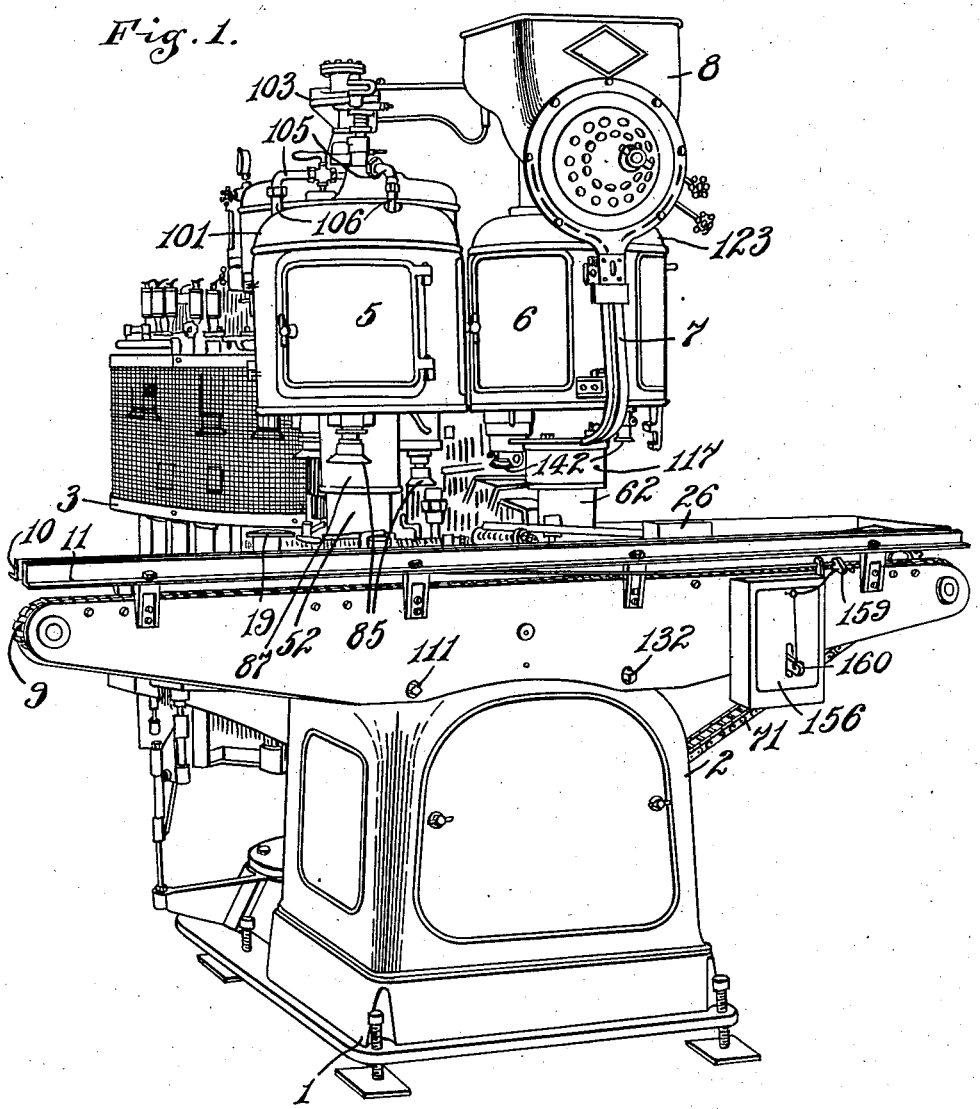
Fig. 1 is a perspective view of a filling machine embodying my invention.

In the embodiment of the invention illustrated the machine is adapted to be mounted on a suitable base I which provides also the necessary enclosing casing 2 for a number of the operating parts thereof. This base supports the filling apparatus 3 of which there is only shown, more or less diagrammatically, the bottle supporting table 4, in Fig. 2. In addition to the filling apparatus there is provided a syruper 5 and a crowner 6 which is provided with a suitable crown feeding chute 7 and crown containing hopper 8. A conveyor 9, which is preferably of the chain type, is also supported by the base I and is driven from the same source of power as is provided for driving the remaining parts of the filler.

Figure 2:
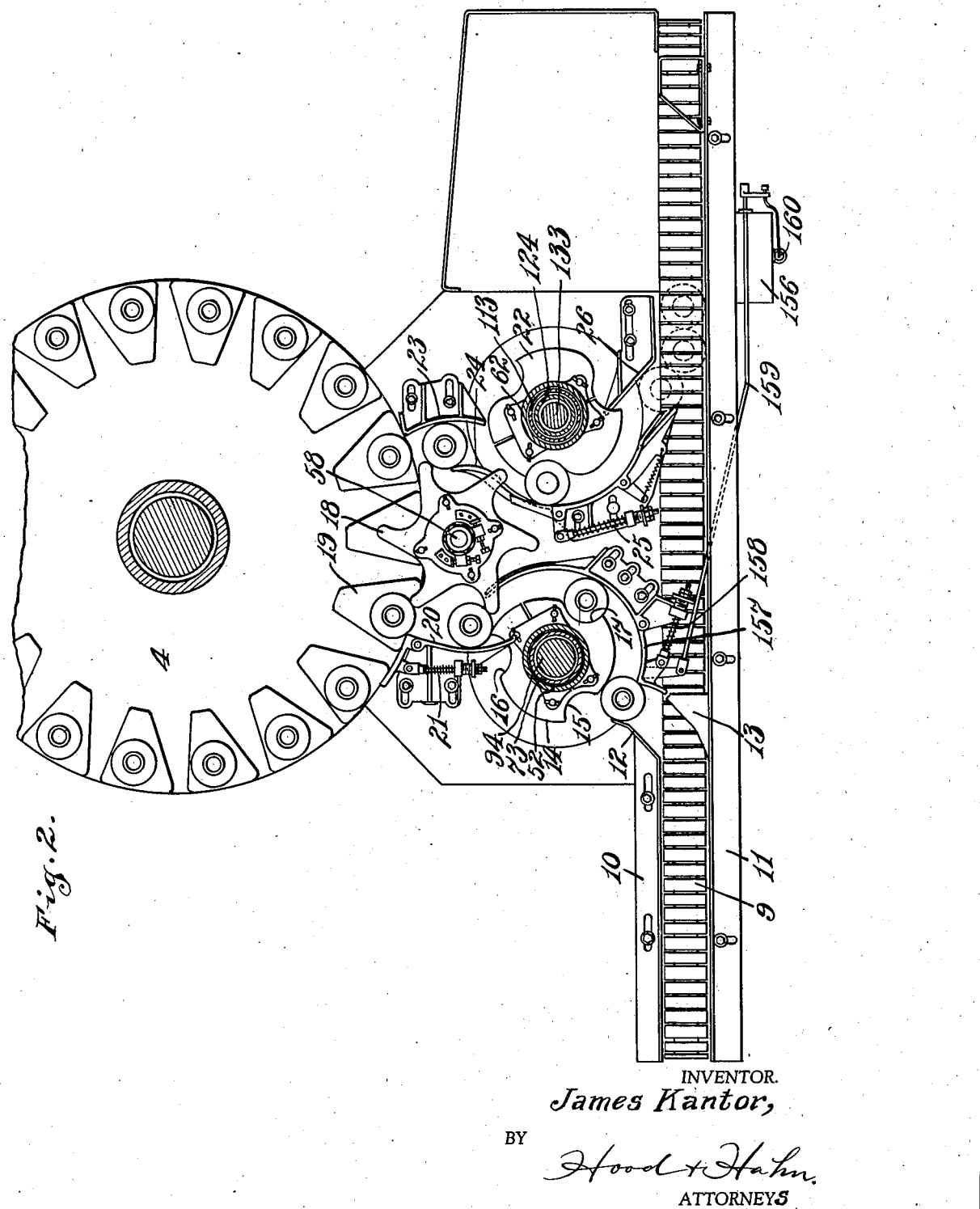
Fig. 2 is a plan view showing the conveying mechanism for delivering the bottle to the syruper, the conveying mechanism for carrying the bottle through the syruper, a diagrammatic plan view of the filler and the returning conveying mechanism for removing the bottle from the filler and passing the same through the crowning machine.
Figure 3:
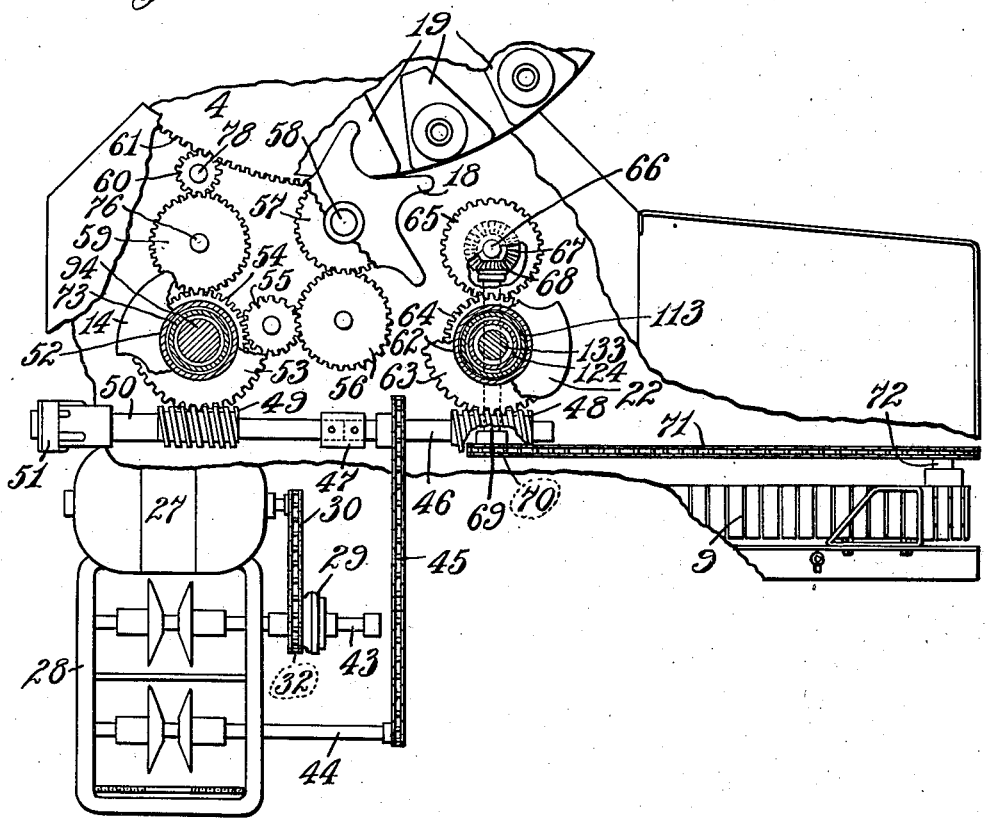
Fig. 3 is a more or less diagrammatic view showing the drive for the respective propelling means for the bottles, including the drive for operating the filler.

Referring now more particularly to Figures 2 and 3, the chain conveyor 9 is adapted to receive the empty bottles and convey the same through suitable adjustable guides 10 and 11, arranged on each side of the conveyor. These guides at their delivery ends are provided with deflecting portions 12 and 13 which turn the bottle off of the conveyor and deliver the same to the propelling star wheel 14 which is provided with three pockets 15, 16, and 17 adapted to receive the bottles as they are delivered thereto from the conveyor and convey the bottles through the syruping stage, ultimately delivering the same to a six-pocket star wheel 18 which receives the bottle from the syruper star and delivers it to one of the bottle receiving tables 19 of the filling machine 4. A suitable guide 20 is provided for assisting in maintaining the direction of travel of the bottle from the syruper star 14 to the table 19 and this guide is resiliently maintained in position by spring mechanism 21. After the bottle has been filled with the carbonated water it is then picked up by the fingers of the star wheel 18 and removed from the bottle table of the filler to be delivered by the star wheel 18 to the crowning star 22, a stationary guide 23 being provided for assisting in the guiding of the bottle to the proper receiving position for the crowner star and a suitable additional guide 24 assists in maintaining the bottle in driving relation in the star 22. This guide is resiliently maintained in position by suitable spring mechanism 25 and a further guide for guiding the bottle from the star wheel 22 again to the conveyor 9 is provided as at 26.

The above mentioned parts, the conveyor chain, the syruper star, the delivery star, the filler table, and the crowning star are in continuous movement and for the purpose of synchronously driving these various parts I provide a mechanism of the character illustrated in Fig. 3. As illustrated in Fig. 3 there is provided an electric motor 27 which in turn drives a suitable variable speed mechanism 28 through a friction clutch 29. This variable speed mechanism may be of any of the well known types, such for instance, as that which is commercially known as the "Reeves" drive, and through the clutch 29 is connected with the motor 27 by a chain drive 30.

Figure 4:
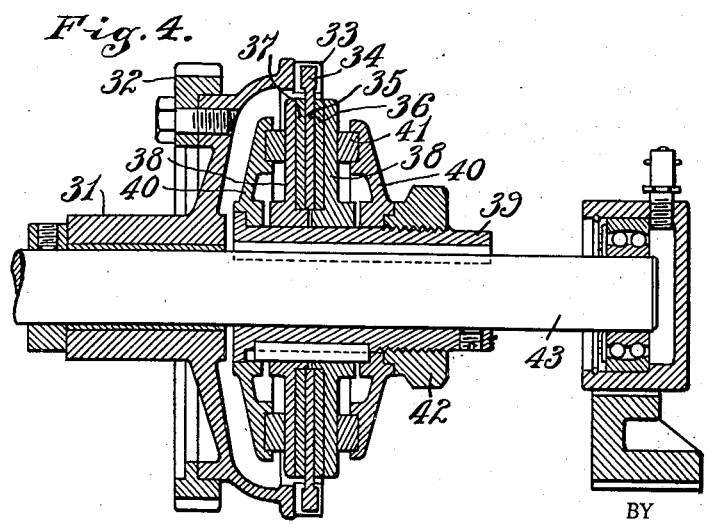
Fig. 4 is a transverse sectional view of a clutch between the driving motor for operating the machine and the drive of the machine.

The clutch 29, as illustrated in Fig. 4, comprises a driving member 31 provided with a sprocket 32 for receiving the chain 30 and this driving member is provided with a series of recesses or pockets 33 on its side face which receive fingers 34 of a friction disc 35. This friction disc lies between a pair of friction members 36 and 37 which constitute the friction faces of a pair of driven discs 38 keyed on a sleeve 39. These driven discs 39 are interposed between a pair of axially stationary abutment discs 40 which in their peripheries are provided with grooves adapted to receive rings 41 of rubber. The rubber rings provide resilient members for holding the driven discs 38 in friction contact with the drive disc 35 and the pressure of these rubber rings may be adjusted by a suitable set nut 42. The sleeve 39 is in turn keyed to the shaft 43, the drive shaft, of the variable speed transmission. This type of clutch provides for a ready slippage in event of the jamming of a bottle at any time during its progress through the machine. The clutch is adjusted to a point slightly above that necessary to pull the mechanism of the apparatus. Therefore any overloading such as would be caused by bottle jamming would cause the clutch to slip and permit the machine to automatically come to a stop. As soon as the jam is cleared the machine is again ready for operation.

The driven shaft 44 of the variable speed drive is connected by a chain 45 with, what may be termed the driving shaft 46 of the machine. This shaft, really constitutes two shafts which are keyed or connected together by the sleeve 47 and is provided with a pair of worms 48 and 49, the worm 49 being mounted on a sleeve 50 driven through a friction drive connection 51 from the shaft 46.

The syruper star 14, as a matter of fact, comprises a pair of star wheels 14 and 14a vertically spaced and mounted on a sleeve 52 which will be more fully described hereinafter. This sleeve at its lower end is provided with a worm wheel 53 adapted to engage and be driven from the worm 49. The sleeve 52 is likewise provided with a gear wheel 54 driving through a train of gears 55 and 56, a gear 57 mounted on the shaft 58 of the conveyor star 18. This gear 54 also meshes with an idler gear 59 in turn driving a pinion 60 meshing with a gear 61 on the filler table whereby, it will be noted, these parts are all driven in unison.

In order that the crowner star 22 may likewise be driven in unison with the remaining parts this star is mounted on a sleeve 62 and in fact constitutes a pair of vertically spaced stars 22 and 22a. This sleeve is provided with a worm gear 63 driven from the worm 48 and is provided with a gear 64 in turn meshing with a gear 65 mounted on a vertical shaft 66 provided at its lower end with a bevel gear 67 driving a bevel gear 68 on a horizontal shaft 69 carrying a chain sprocket 70. This chain sprocket 70 drives the chain 71 which in turn is connected with the driving shaft 72 of the conveyor 9.

Figure 5:
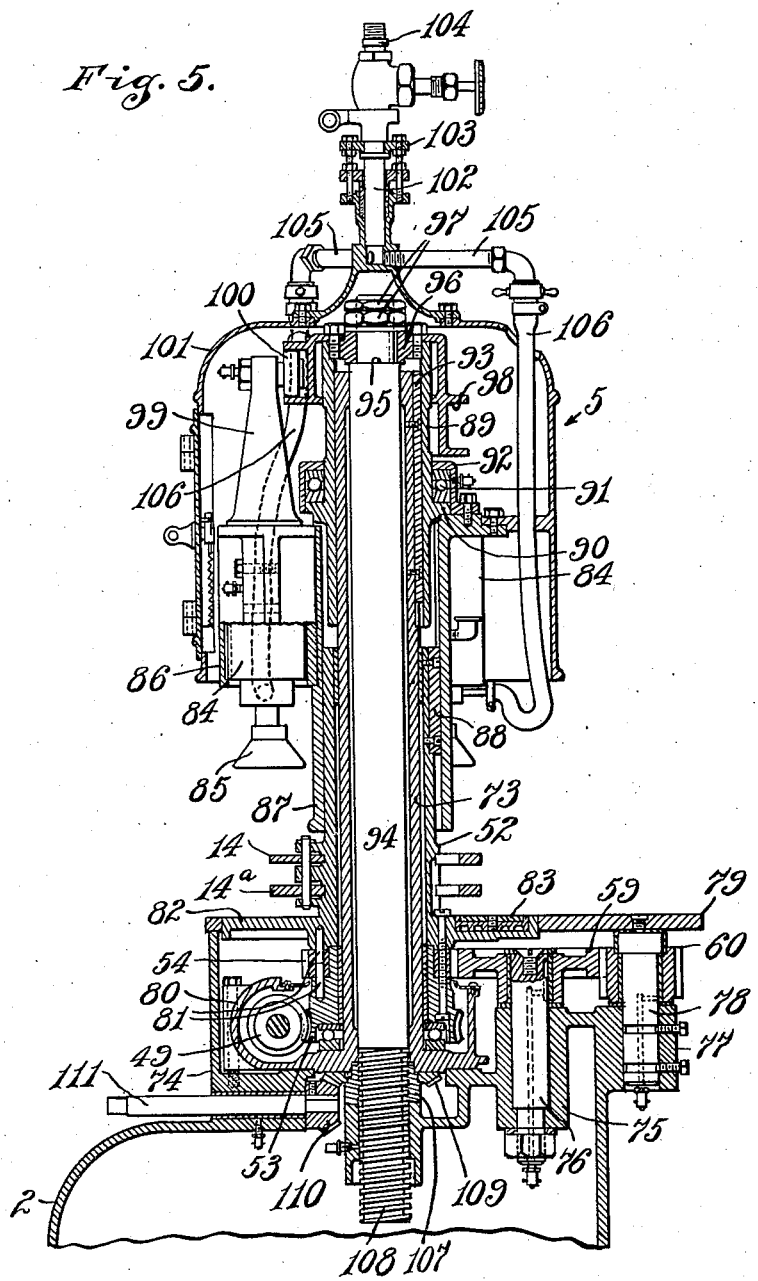
Fig. 5 is a transverse sectional view of the syruping mechanism.
Figure 6:
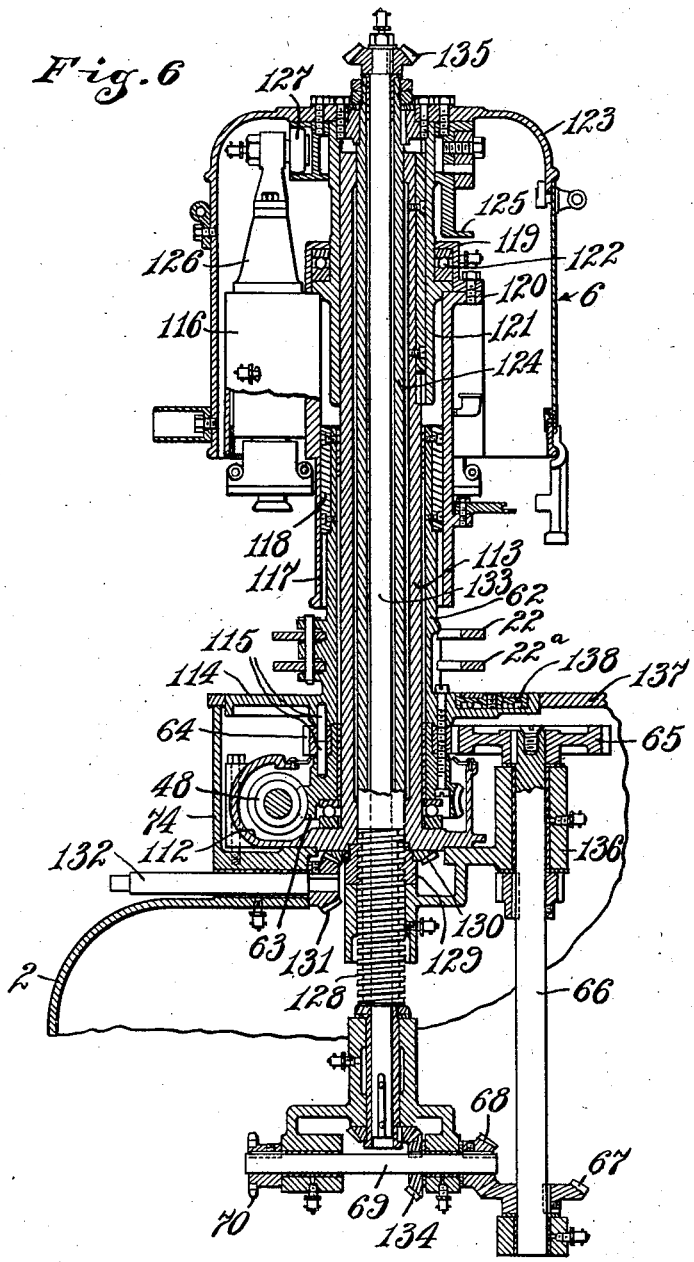
Fig. 6 is a transverse sectional view of the crowner assembly.

Referring now more particularly to Fig. 5 which illustrates, in section, the syruper it will be noted that the worm gear 53 surrounds a vertical sleeve 73 extending upwardly from the part 74 of the enclosing casing 2. This sleeve 73 is supported from the enclosing casing portion 74 which in turn has formed integrally therewith a bearing 75 for the shaft 76 of the gear 59 and a bearing 77 for the shaft 78 of the pinion 60. The bottle table 79 is also supported from this part of the casing which likewise supports a housing 80 for the worm 49. The hub of the worm gear 53 is pinned by suitable connecting pins 81 to the sleeve 52, so that this sleeve will rotate therewith and this sleeve is provided with a rotatable bottle table 82, flush with the top of the housing section 74 and provided with a bottle spot 83 so that as the bottle is fed to the syruper star 14 it will not be dragged over a stationary table but will be mounted on, during its movement with the syruper star, a rotatable table.

The syruper 5 is provided with three reciprocating syrup delivery members 84, one for each of the syruper star pockets and each of which is provided with an engaging head 85 adapted to engage the mouth of the bottle, as the same is moved in position therebeneath. The syruper is reciprocable for the purpose of engaging and delivering a charge of syrup to the bottle and to this end is reciprocably mounted in a supported sleeve 86 in turn carried on a sleeve 87 surrounding the driving sleeve 52 and keyed thereto by a suitable key and slot connection 88. As a matter of fact the sleeve member or syrup carrier is provided with three sleeves 86 in each of which is reciprocably mounted a syruper. This carrier 87 is supported from a carrier sleeve 89 provided with an annular flange 90 to provide a ball bearing support 91 for a flange 92 secured to the carrier sleeve 87 and the carrier sleeve 89 is keyed as at 93 to the stationary sleeve 73 so that the carrier sleeve is stationary although vertically adjustable relative to the syrup carrier sleeve, which as has heretofore been described, is rotatable.

The carrier sleeve 89 is supported from a vertically adjustable supporting post 94 which is shouldered as at 95 at its top and supports a collar 96 to which the carrier sleeve is bolted, this collar being secured on the post 94 by means of set nuts 97. In addition to the carrier sleeve 89, there is provided a cam track 98, which is stationarily mounted and through the medium of which the syruper is reciprocated during its rotating movement. To this end the reciprocating syruper 84 is provided with a yoke 99 the upper end of which is provided with a roller 100 adapted to operate in the cam track 98 so that, due to the shape of the cam track as the syruper rotates the roller will move the yoke up and down to engage the throat 85 with the neck of the bottle during the syruping operation and again raise the throat during the period that a bottle is removed from the syruper or delivered thereto. It will be noted in this connection that the housing 101 enclosing the syruper parts rotates with the syruper and this housing has upwardly extending therefrom a supply conduit 102 connected by a rotating joint 103 with a supply pipe 104 leading from the syrup supply. This conduit 102 has extending therefrom three conduits 105, each of which is connected by a flexible hose 106 with the syruper for the purpose of supplying the syrup to the syruper.

The supporting post 94 is adjustable for the purpose of varying the height of the syruper to accommodate different height bottles through the medium of a vertically stationarily mounted nut 107 engaging the bottom threaded end 108 of the post and provided with a beveled gear 109 meshing with a beveled pinion 110 operated from the exterior of the machine through a hand-manipulated shaft 111.

Referring now specifically to the crowning mechanism, the driving mechanism and supporting mechanism of the crowner is likewise encased in and supported by the section 74 of the enclosing casing 2, although it is at the opposite end of the casing. The worm gear 63, to which reference has heretofore been made, and the worm 48 are enclosed in a housing 112 within the housing portion 74 and this housing forms a part of a stationary hollow vertically extending sleeve 113 which is surrounded by the worm gear 63 as well as the sleeve 62 driven thereby. This sleeve 62 supports, as well as the two crowner star wheels 22 and 22a a bottle carrying table 114 which rotates with the star wheel 22 and is pinned to the gear wheel 63 through the medium of locking pins 115.

Like the syruper the crowner is provided with three crowning heads, the crowning mechanism of which is reciprocated vertically for the purpose of applying and crimping the crown to the bottle. Each of these heads reciprocates in a head sleeve 116 which in turn is provided with the hollow drive 117 surrounding the driving sleeve 62 and keyed as at 118 therewith. The crowner sleeve is supported from an annular support 119 resting upon an annular flange 120 on the carrier sleeve 121, a suitable ball bearing 122 being interposed between these parts, in view of the fact that the carrier sleeve 121 is stationary. This carrier sleeve 121 is secured to, by means of suitable bolts, the stationary casing 123 surrounding the operating parts and supported from the top of a vertically adjustable supporting post 124. This post together with the casing 123 carries a cam track 125 similar to the cam track 98 of the syruper and so shaped as to cause reciprocation of each of the crowners as the same rotate about the supporting post. To this end each crowner is provided with a yoke 126 provided at its upper end with a roller 127 adapted to operate in the cam track 125 so that, as the roller moves through the track, a portion of which is depressed, the crowner will be raised and lowered.

The supporting post 124, at its lower end, is screw threaded as at 128 and is supported upon a vertically stationary nut 129 provided with a beveled gear 130 meshing with a beveled gear 131 manually rotated through the means of the shaft 132 for the purpose of vertically adjusting this post and with it the crowners to permit for an adjustment for different size or height of bottles. This supporting post is hollow to accommodate a vertical shaft 133 which extends therethrough, being driven at its lower end from a beveled gear drive 134 from the shaft 69 and being provided at its upper end with a beveled gear 135 for the purpose of driving the agitator of the crown hopper.

This casing section 74 also has formed integrally therewith a bearing support 136 for the shaft 66 and also supports the stationary portion 137 of the table, that portion 114 of the table, which is rotatable and is provided with a bottle spot 138 being flush with the top of the table 137 and for this purpose being set in, as is the case with respect to the syruper, a recess in the table.

It will be understood that like the syruper mechanism there is provided three of the reciprocating crowners, one for each of the notches in the crowner star 22. These like the syruper are equally spaced apart around the central post and rotate with the feeding star.

Figure 7:
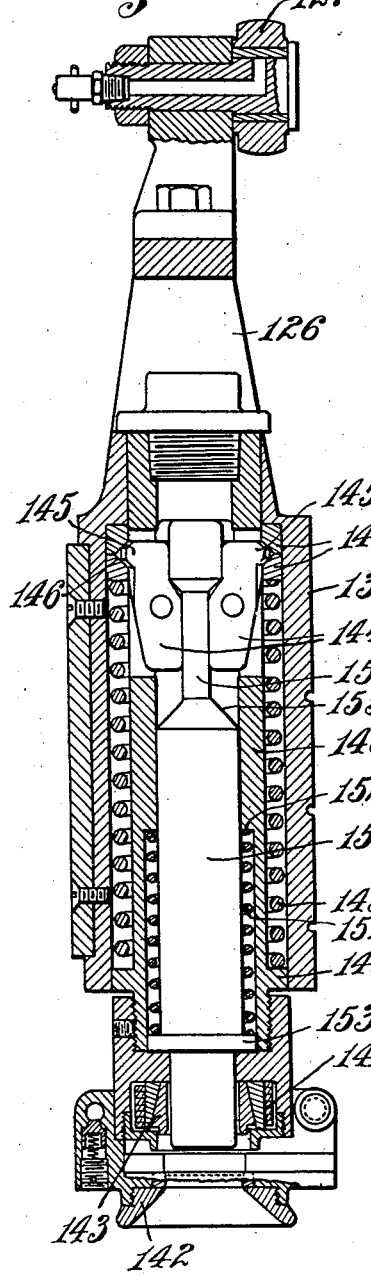
Fig. 7 is a detail sectional view of the crowner.
Figure 8:
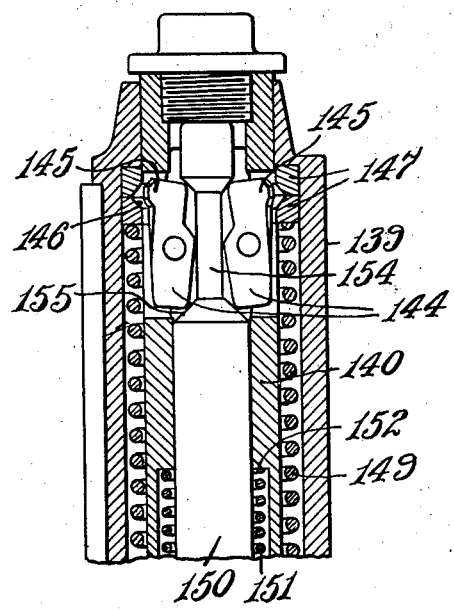
Fig. 8 is a detail sectional view showing another position of certain parts of the crowner.

The specific structure of each of the crowning units is illustrated more in detail in Figs. 7 and 8. Referring to these figures the yoke 126, at its lower end, is provided with a hollow cylindrical housing 139. A hollow stem 140 is reciprocably mounted within this housing and carries at its lower end the crowning head 141, adapted to engage and crimp the crowns on the bottles. A detail description of this head is not necessary at this point as the same is fully illustrated and described in my co-pending application filed October 20, 1930, Serial No. 489,777. Suffice to say that this head comprises a centering bell 142 and a suitable throat having suitable crimping mechanism 143. The stem 140 is provided at its upper end with a plurality of pivoted dogs 144, the noses 145 of which are adapted to take into a V slot 146 formed by the two ring members 147 located at the upper end of the housing 139 and held in stationary position therein. Interposed between these ring members and an annular flange 148 is a coil spring 149.

Arranged within the hollow stem 140 is a plunger 150 maintained in its downward position, relative to the stem 140 and crowner throat by a coiled spring 151 interposed between a shoulder 152 on the stem 140 and an annular flange 153 on the plunger. The upper end of this plunger has a reduced portion 154 which provides a space to accommodate the dogs 144, and at the lower end of this reduced portion 154 a tapered shoulder 155 is formed, forming a cam member for spreading the lower ends of the dogs 144 during the operation of the crowner.

In operation, as the crowning unit descends the top of the bottle is engaged and centered in the throat 142, the unit descending until the bottom of the plunger 150 contacts with the top of the cap or crown. The plunger 150 thus comes to a stop while the remaining portion including the crowning head and crimper continue to descend, the plunger being maintained in contact with the top of the cap and holding the same securely seated on the bottle through the medium of the coiled spring 151. The continued downward movement of the stem 140, which it will be remembered is positively connected, through the dogs 144, with the housing 139 forces the throat and crimper mechanism downward over the bottle crimping the crown in position. The actual movement, for crimping purposes, is only about a half inch and by the time the stem 140 has completed this half inch movement the cam shoulder 155 engages the lower ends of the dogs 144 spreading their lower ends and disengaging the noses 145 from the V slot 146 thereby disengaging the positive connection between the stem 140 and the housing 139 so that the housing 139 can continue in its downward movement without bringing undue stress upon the crowning head. This construction provides for the compensation of and automatically takes care of any variations in bottle heights and prevents any crushing tendency on the part of the crowner where the bottles vary slightly in height.

I have not considered it necessary to illustrate and describe fully the crown feeding mechanism. Suffice to say that the crown hopper 8 is provided with a chute 7 which automatically feeds a crown into each crowning unit as the unit passes the chute and before the unit commences to descend into engagement with the bottle.

Furthermore, it has not been considered necessary to specifically describe and illustrate the bottle filling mechanism, as such a mechanism may be of the type as that illustrated in my issued Patent No. 1,847,485 dated March 1, 1932 or of a similar type.

The circuit of the electric motor 27 is controlled through the medium of a switch 156 and cooperating with the syruper star wheel 14 is a guide member 157 resiliently maintained in position by a spring mechanism 158 and adapted to yield under unusual pressure. This guide member 157 is connected by a link mechanism 159 with an operating arm 160 of the switch 156 so that in event a bottle jams in passing into the syruper feeding star the continued pressure of the bottle against the guide member 157 will move the guide member in a direction to throw the switch 156 opening the motor circuit and thus completely stopping the machine.

I claim as my invention:

1. In a bottle filling machine, the combination with a filler including a continuously moving bottle supporting means, a reciprocating syruping unit associated with said supporting means, a continuously moving means maintaining the bottle in receiving position relative to said syruping unit during the syruping action thereof, means for moving the syruping unit with the bottle maintaining means during the delivery of the syrup thereto and a single continuously moving means timed to engage and remove the bottle from the syruping maintaining means and deliver the same to the filler supporting means and remove the bottle from said filler supporting means.

2. In a bottle filling machine, the combination with a bottle filler including a continuously moving bottle supporting means, a reciprocating syruping unit associated therewith, a reciprocating crowning unit associated therewith, continuously moving positioning means for positioning the bottle relatively to the syruping unit, continuously moving means for positioning the bottle relatively to the crowning unit, said crowning unit and syruper moving with their respective positioning means during the syruping and crowning operation and continuously moving means for removing the bottle from the syruper positioning means and delivering the same to the filler supporting means and removing the bottle from said filler supporting means and delivering the same to the crowner positioning means.

3. In a bottle filling machine, the combination with a bottle filler including a continuously moving support, of a continuously moving syruper reciprocably mounted for engagement with the bottle during the syruping operation, a continuously moving crowning machine reciprocably mounted for engagement with the bottle during the crowning operation, means for moving the bottle with the syruper during the syruping operation, means for moving the bottle with the crowner during the crowning operation and continuously moving means for removing a bottle from the syruper and delivering the same to the filler-supporting means and removing the bottle from the filler-supporting means and delivering the same to the crowner.

4. In a bottle filling machine, the combination with a bottle filler including a continuously rotating bottle supporting means, of a continuously rotating syruping means reciprocable into engagement with a bottle during the syruping operation, a continuously rotating positioning means for receiving the bottle and positioning the same beneath the syruper, a continuously rotating crowning unit reciprocable into engagement with the bottle during the crowning operation, continuously rotating means for receiving and positioning the bottle beneath said crowning unit and a continuously rotating means for removing the bottle from the syruper positioning means and delivering the same to the filler supporting means and removing the bottle from the filler supporting means and delivering the same to the crowning positioning means.

5. In a bottle filling machine, the combination with a filler including a continuously moving bottle supporting means, a reciprocating syruping unit associated with said supporting means, a continuously moving means maintaining the bottle in position relative to the syruping unit, means for moving the syruping unit with the bottle during the delivery of the syrup thereto, means actuated by the movement of the syruping unit with the bottle for reciprocating the syruping unit, and a single continuously moving means for removing the bottle from the syruping maintaining means and delivering the same to the filler supporting means and removing the bottle from said filler supporting means.

6. In a bottle filling machine, the combination with a syruping unit continuously moving with the bottle during the syruping operation, a filling machine including a continuously moving bottle supporting member, a crowning unit continuously moving with the bottle during the crowning operation, a continuously moving conveyor for delivering the bottle to said syruping unit, continuously moving means for delivering the bottle from the syruping unit to the filler and for delivering the bottle from the filler to the crowning unit, a single driving motor for operating said various units including the conveyor and a slip connection between said motor and said units.

7. In a bottle filling machine, the combination with a bottle filler including a continuously moving bottle supporting member, a syruping unit continuously movable with the bottle during the syruping operation, a crowning unit continuously movable with the bottle during the crowning operation, a conveyor for delivering the bottles to the syruping unit and receiving the bottles from said crowning unit and continuously driven, a single continuously moving transfer means for removing the bottle from the syruper to the filler and from the filler to the crowner, a driving shaft having driving connections with said various units for continuously operating the same, a motor for driving said shaft and a slip connection between said motor and said shaft.

8. In a machine of the character described, the combination with a single continuously rotating transfer member, of a continuously rotating syruper, a continuously rotating bottle filler and a continuously rotating crowner grouped about said transfer member and so positioned that the bottles on the syruper will be engaged by the transfer member and delivered to the filler and the bottles on the filler will be engaged by the transfer member and delivered to the crowner.

9. In a machine of the character described, the combination with a stationary platform, of a continuously rotating syruper having a bottle-receiving support in the same plane as said platform, a continuously rotating crowner adjacent said syruper and having a bottle-receiving support in the same plane as said platform, a continuously-rotating transfer member extending above said platform between said syruper and said crowner and a continuously-rotating bottle filling machine having bottle-supporting means moving adjacent said platform, said transfer means being positioned to remove the bottles from the syruper and deliver the same to the filling machine and remove the bottles from the filling machine and deliver the same to the crowner.

10. In a machine of the character described, the combination with continuously-moving bottle-supporting means of a filling unit, a continuously-rotating syruper, a continuously rotating crowner, a single continuously rotating transfer means for removing the bottles from said syruper and delivering the same to said filling machine, a stationary guide means cooperating with said transfer means in said delivery, said transfer means being positioned to remove the bottles from the filling machine and deliver the same to the crowner and stationary guide means associated with said transfer means for cooperating therewith in delivering the bottles to the crowner.

11. A filling machine comprising a rotary syruping mechanism, a rotary filling mechanism and a rotary crowning mechanism, means to deliver containers to the syruping mechanism, a transfer means to move containers about one side thereof from the syruping mechanism to the filling mechanism, said transfer means being adapted to move containers about the other side thereof from the filling mechanism to the crowning mechanism and means to remove containers from the crowning mechanism.

12. The combination in a filling machine, of a conveyor, a rotary syruping mechanism, means to move containers from one end of said conveyor to said syruping mechanism, a rotary filling mechanism, rotating transfer means to move containers about one side thereof from said syruping mechanism to said filling mechanism, a rotary crowning mechanism, said rotating transfer means being adapted to move containers about the opposite side thereof from said filling mechanism to said crowning mechanism, and means to move containers from said crowning mechanism to the opposite end of said conveyor.

13. A filling machine comprising a worktable, a conveyor movable upon said worktable, a rotary syruping mechanism including a spider to hold containers in position with respect to said syruping mechanism, a rotary infeed spider to move containers from one end of said conveyor to said syruping spider, a rotary filling mechanism, a rotary transfer spider adapted to move containers about one side thereof from said syruping mechanism to said filling mechanism, a rotary crowning mechanism including a spider to hold containers in position with respect to said crowning mechanism, said transfer spider being adapted to move containers about the opposite side thereof from said filling mechanism to said crowning mechanism, and an outfeed spider adapted to move containers from said crowning mechanism to the opposite end of said conveyor.

14. The combination in a filling machine, of a rotary syruping mechanism, a rotary filling mechanism, a rotary crowning mechanism, a rotary transfer means to move containers from the syruping mechanism to the filling mechanism and from the filling mechanism to the crowning mechanism, said mechanisms and said means being mounted upon vertical shafts, a motor, a driving shaft extending from the motor and geared, through intermediate gearing, to each of said vertical shafts.

15. The combination with a filling machine, including a rotary syruping mechanism, a rotary filling mechanism, and a rotary crowning mechanism, of rotary transfer means to move containers from the syruping mechanism to the filling mechanism, and from the filling mechanism to the crowning mechanism, said filling mechanism and said transfer means being mounted on vertical shafts, a horizontal driving shaft, and gearing connection between said horizontal shaft and the vertical shaft of the transfer means and the filling mechanism shaft.

16. A filling machine comprising a rotary syruping mechanism, a rotary filling mechanism, and a rotary crowning mechanism, the syruping mechanism and the crowning mechanism being respectively provided with a plurality of syruping and crowning heads and spiders to position the bottles in alignment with the heads, and means to feed bottles to the syruping spider, the filling mechanism being provided with a plurality of bottle supporting platforms and filling heads in alignment with the latter, a transfer spider to move bottles from the syruping spider to the bottle supporting platforms and to remove bottles from the bottle supporting platforms to the crowning spider, means to remove bottles from the syruping spider and means to cause the syruping, filling, and crowning mechanisms, and the transfer spider and said feeding and removing means to be synchronously actuated.

17. A filling machine comprising a worktable, a conveyor movable upon said worktable, a rotary syruping mechanism including a spider to hold containers in position with respect to said syruping mechanism, a rotary filling mechanism, a rotary transfer spider adapted to move containers about one side thereof from said syruping mechanism to said filling mechanism, a rotary crowning mechanism including a spider to hold containers in position with respect to said crowning mechanism, said transfer spider being adapted to move containers about the opposite side thereof from said filling mechanism to said crowning mechanism.

JAMES KANTOR.